United States Patent Office 3,090,378
Patented May 21, 1963

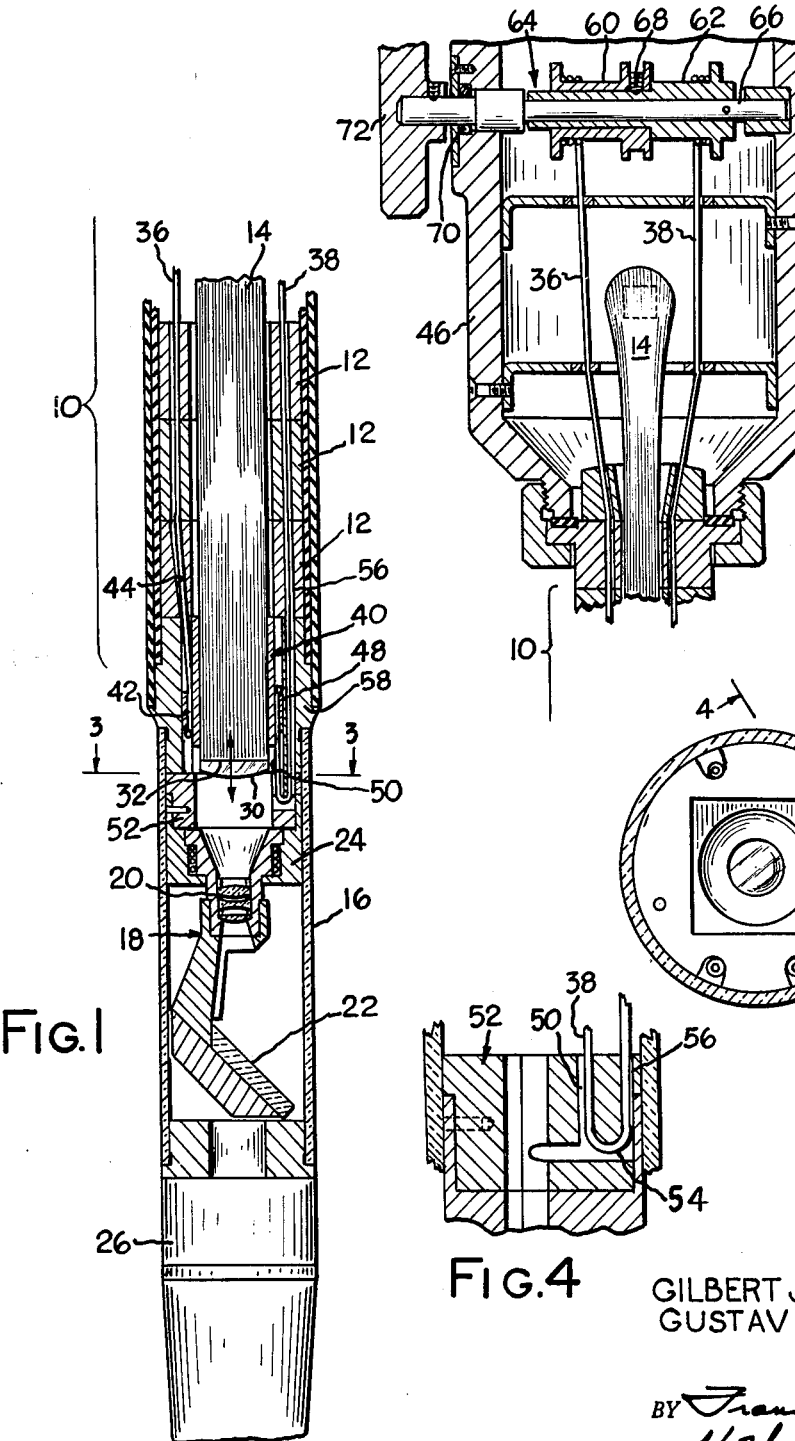

3,090,378
FOCUSING ENDOSCOPE
Gilbert J. Sheldon, Irondequoit, and Gustav A. Ulrich, Rochester, N.Y., assignors to Bausch & Lomb Incorporated, a corporation of New York
Filed May 16, 1960, Ser. No. 29,416
3 Claims. (Cl. 128—4)

This invention relates to an improved endoscope including means for positionally adjusting an element at the front, or viewing end for focusing an image to be transmitted to the rear, or control end thereof.

The practice of the invention is presently thought to be of particular advantage for use in a flexible endoscope of the type in which a light image is transmitted by a flexible transmission system such as, for example, a coherent bundle of light transmitting fibers, and in which focusing cannot be accomplished by adjustment of the eyepiece.

One important object of the present invention is to provide an improved flexible endoscope capable of producing an accurately focused light image of objects within its field of view despite relatively large variations in the working distance between the objective lens and the object being viewed.

Other objects are: to provide an improved flexible endoscope including a flexible light image transmission system, an optical objective in front of the transmission system and means for accurately focusing the image produced by the objective at the pickup surface of the transmission system; to provide an improved flexible endoscope including a fixed optical objective, a fiber bundle for receiving an image from the objective and transmitting the image to a desired location for observation, and means for moving the receiving end of the fiber bundle into coincidence with the image plane of the objective, which varies in position according to the range of the object being viewed; to provide an improved flexible endoscope of this type including means actuatable from the rear of the endoscope for adjusting the position of a focusing element at the front of the endoscope; and in general, to provide an improved flexible endoscope including means for focusing a light image, thereby permitting the use of a relatively high speed objective lens and extending the depth of the available viewing field.

The foregoing and other objects and advantages of the present invention will become apparent in the following detailed description of representative embodiments thereof, taken in conjunction with the drawings wherein:

FIG. 1 is a fragmentary, longitudinal sectional view of the front, or objective end portion of an endoscope according to the invention, particularly showing the objective assembly and the receiving end of the light image transmission system;

FIG. 2 is a fragmentary, longitudinal, sectional view of the rear, or control portion of the endoscope shown in FIG. 1, particularly showing the remote control arrangement for focusing;

FIG. 3 is a cross sectional view taken along the line 3—3 of FIG. 1;

FIG. 4 is a fragmentary longitudinal sectional view taken along the line 4—4 of FIG. 3.

Figure 5:
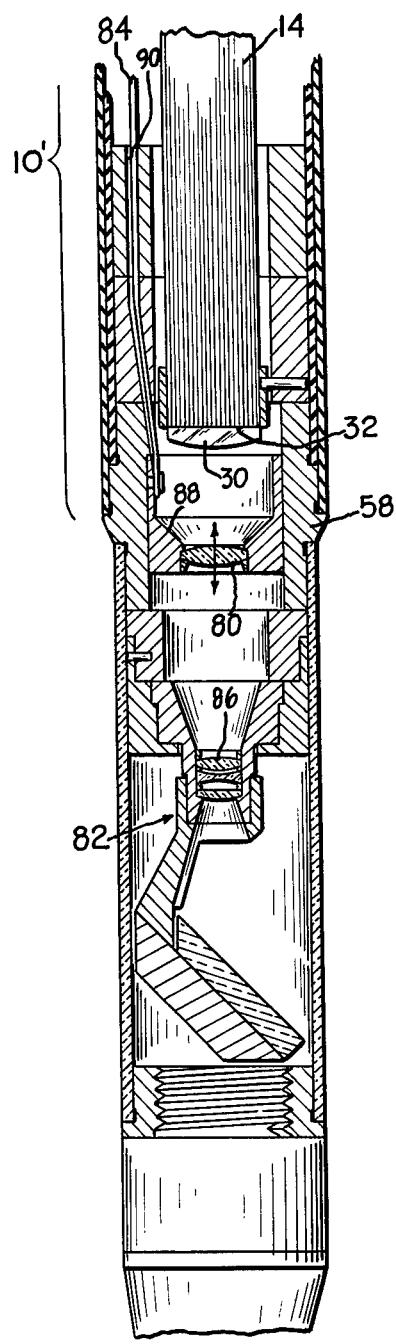
FIG. 5 is a fragmentary, longitudinal, sectional view of the front, or objective portion of an endoscope according to a second, and presently preferred embodiment of the invention.

Previous endoscopes of the rigid type have included means for focusing an image by adjusting the eyepiece, or telescope, which is located at the rear, or control end of the endoscope a relatively large distance away from the objective. Previous endoscopes of the flexible type have generally not included any focusing means, but instead have relied upon a relatively long depth of field in the objective lens system in order to achieve a tolerable degree of image clarity throughout a satisfactory range of view. This necessitates the use of a relatively slow speed objective in such endoscopes, and reduces the brilliance of the transmitted image relative to the brilliance of an image that could be produced by a relatively high speed objective.

The problem is particularly apparent when dealing with flexible endoscopes, wherein a clear line of sight cannot be maintained between the telescope, or eyepiece and the image plane of the objective. In this type of instrument it is generally necessary to provide an image transmission system for transmitting an image from the objective image plane to the control end of the endoscope where the image may be observed, and it is not possible to obtain a greater resolution in the image at the exit end of the transmission system than is present in the image at the receiving end.

Broadly, the present invention contemplates means for producing a focused image on a selected surface at the objective, or front end of an endoscope, so that the image may be transmitted with maximum resolution, brilliance and clarity to the rear, or control portion for observation. In the embodiments illustrated, the transmission system is composed of a coherent bundle of transparent fibers such as glass fibers, which extend through the length of the endoscope from the objective portion to the control portion. Remote control means, including an actuator at the control portion are provided for moving a focusing element at the front of the endoscope thereby to focus an image of an object under observation on the face of the fiber bundle regardless of the spacing of the object from the objective.

An endoscope representing a first embodiment of the invention is shown in FIGS. 1–4, and includes an elongated, flexible, tubular portion 10 composed of any desired number of articulated tubular segments 12, which enclose a coherent bundle 14 of light transmitting filaments. A viewing window 16 is sealed at the front of the flexible portion 10 for housing an objective assembly 18. The objective assembly 18 includes an objective lens 20, an inclined mirror 22 spaced in front of the lens 20 in fixed relationship thereto, and a rotatable mount 24 for rotatably securing the objective assembly 18 within the window 16. A relatively soft and highly flexible guide 26 is secured to and closes the front end of the window 16.

The fiber bundle 14 extends through the articulated segments 12 from the rear, or control portion of the endoscope to a position spaced rearwardly from the objective lens 20. A field lens 30 is cemented upon the front face 32 of the fiber bundle for concentrating the image light from the objective 20 into the fibers of the bundle 14.

In operation, the front, or objective portion of the endoscope is inserted into a body cavity such as the stomach or the duodenum for observing the interior thereof. Means (not shown) are provided for inflating the body cavity and thereby stretching its walls as desired, and for rotating the objective assembly 18 about the longitudinal axis of the cylindrical window 16 for scanning purposes. Images of objects spaced different distances from the window 16 fall in focus in different planes behind the objective lens 20 in accordance with the laws of optics, depending upon the ranges of the various objects being viewed.

In order to achieve maximum illumination of the image, the objective lens 20 is preferably a relatively fast lens such as, for example, about $f1:4$, or faster. Lenses of such relatively high speed have relatively small depth of field, and therefore it is desirable to provide a focusing adjustment in order to bring the images of the various objects under observation into accurate focus on the face 32 of the fiber bundle. According to this embodiment of the invention, focusing is accomplished by moving the front end portion of the fiber bundle 14 along the optical axis to vary the spacing between the receiving face 32 of the fiber bundle and the objective lens 20. In the illustrated construction, it has been found possible to provide a focusing range from infinity down to the outer surface of the window 16.

The mechanical arrangement for accomplishing adjusting movement of the face 32 of the fiber bundle includes a pair of flexible tension members 36 and 38, respectively, which are secured to a ferrule 40 at the front end of the fiber bundle 14. The ferrule 40 secures the fibers of the bundle 14 together and is tightly fitted therearound and preferably cemented thereto. The first tension member 36 is secured to a small tab 42 in one side of the ferrule and is trained directly rearwardly therefrom through a guideway 44 in the segments 12 to the control housing 46 at the rear of the endoscope. The second tension member 38 is secured to a second tab 48 on the ferrule and trained forwardly therefrom through a first guideway 50 formed in a terminal member 52, which is secured as by cementing at the forward end of the flexible portion 10. The second flexible tension member 38 is then trained rearwardly over a rounded shoulder 54 in the terminal member 52 and through a guideway 56 in the terminal member 52 and in the segments 12 back to the control housing 46. The ferrule 40 fits smoothly within the front segment 58 of the articulated flexible portion of the endoscope, and is constrained therein for smoothly guided reciprocating travel in response to alternate tensioning of the tension members 36 and 38.

A rearward pull on the first tension member 36 pulls directly rearwardly on the ferrule 40 to retract the receiving face 32 of the fiber bundle for focusing the image of an object spaced closely to the window 16. A rearward pull on the second tension member 38 exerts a forward pull on the ferrule 40 to advance the receiving face 32 of the fiber bundle for focusing upon a more distant object.

In practice, for the patient's comfort and well being, it is desirable to make the endoscope as small and compact as possible. The present construction may be made of minimum size since the tension members 36 and 38 may be relatively small diameter filaments of a material such as nylon or the like, which has relatively high strength, a high degree of flexibility, and excellent abrasion resistance.

At the control end of the endoscope, the tension members 36 and 38 are wound in opposite directions upon separate reels 60 and 62 respectively of a double windlass 64 so that turning of the windlass in one direction unwinds one of the tension members while winding up the other one. Preferably, the windlass 64 is made adjustable so that the two tension members 36 and 38 may be adequately tensioned in opposition to each other for smooth operation and proper "feel."

Toward this end, the first reel 60 is rotatably mounted upon the shaft 66 of the windlass and selectively lockable thereto by any desired detent means such as the set screw 68 illustrated. The second reel 62 is permanently fixed to the shaft 66. The shaft 66 is journaled in the walls of the housing 46 and extends outwardly therefrom through an O-ring seal 70. A crank, or knob 72 is fixed to the shaft 66 exteriorly of the housing for convenient manual manipulation.

When it is desired to adjust the tension between the two tension members 36 and 38, it is only necessary to loosen the set screw 68, which holds the rotatable reel 60 to the shaft 66, and then to rotate the rotatable reel 60 until the desired tension is achieved. The set screw 68 is then again tightened to fix the reel 60 upon the shaft 66.

According to another presently preferred embodiment of the invention as shown in FIG. 5, focusing is achieved by adjusting a movable lens element 80 of the objective assembly 82, instead of adjusting the position of the face 32 of the fiber bundle. An alternative remote control arrangement is also illustrated in FIG. 5 comprising a Bowden wire 84, in place of the two tension lines 36 and 38 used in the embodiment shown in FIGS. 1–4.

In the embodiment shown in FIG. 5, the objective assembly 82 includes a fixed optical portion 86 and a movable lens element 80 for focusing the image on the face, or entry surface 32 of the fiber bundle 14. The movable element 80 is fixed in a holder 88, which is slidable in the front terminal member 58 of the flexible portion 10' of the endoscope. The Bowden wire 84 is secured to the holder 88 and extends through a confining guideway 90 along the flexible portion 10' to the control end (not shown) of the instrument. The Bowden wire 84 is relatively stiff, i.e., resiliently flexible, so that it will not buckle under compression, but is capable of transmitting a pushing force to advance the movable element 80 forwardly when desired.

The Bowden wire 84 may be used alternatively for moving the fiber bundle 14 in the embodiment shown in FIGS. 1–4, and, similarly, opposed tension members such as those shown in FIGS. 1–4 may be used for moving the movable optical element 80 in the embodiment shown in FIG. 5.

Relatively precise focusing may be achieved in both embodiments of the invention. The embodiment shown in FIG. 5 has the advantage of somewhat easier movement, because the holder 88 together with the lens 80 is less massive, and encounters less frictional resistance than does the fiber bundle 14 and is more easily moved.

It should be noted that the optical arrangement illustrated in FIG. 5 provides focusing adjustment without requiring movement of the front objective element 86, and thus permits changing the range without otherwise disturbing the field of view as would be the case were the entire objective assembly 82 movable relative to the endoscope.

Other details of the endoscope illustrated in the drawing, but forming no part of the present invention are described and claimed in the following co-pending applications for Letters Patent of the United States:

Gilbert J. Sheldon, Ser. No. 679,566, filed August 22, 1957, entitled "Flexible Tube Structures," and now Patent No. 3.060,972.
Gilbert J. Sheldon, Ser. No. 686,320, filed September 26, 1957, entitled "Optical Viewing Instrument," and now Patent No. 2,975,785.
Gilbert J. Sheldon, Ser. No. 715,820, filed February 17, 1958, entitled "Optical System for Endoscopes and the Like," and now Patent No. 2,987,960.
Gilbert J. Sheldon, Ser. No. 815,387, filed May 25, 1959, entitled "Illumination Means for Diagnostic Instrument," and now Patent No. 3,042,022.
John T. Ferris, et al., Ser. No. 29,264, filed concurrently herewith, entitled "Duodenoscope," and now Patent No. 3,057,345.
John T. Ferris, et al., Ser. No. 29,417, filed concurrently herewith, entitled "Improved Endoscope Illumination."
John T. Ferris, et al., Ser. No. 29,442, filed concurrently herewith, entitled "Illumination System for Endoscopes and the Like."
Gustav A. Ulrich, Ser. No. 29,255, filed concurrently herewith, entitled "Holder for Camera and Viewing Device."
Gustav A. Ulrich, Ser. No. 29,443, filed concurrently herewith, entitled "Bidirectionally Flexible Segmented Tube."

What is claimed is:
1. In a device of the character described comprising in combination, an endoscope including an elongated coherent bundle of optical fibers for transmitting a light image from the front to the rear of said endoscope, an optical objective means mounted in the front of said endoscope for projecting an image on the front face of said bundle of optical fibers, focusing means controllably moving the front face of said bundle of fibers selectively to and from said objective means to focus said image received from said objective means on said front face including, actuating means mounted at the rear of said endoscope flexible tension means comprising two longitudinally extending portions connecting said actuating means with the front portion of said bundle for moving the front face of said bundle means to provide coincidental relationship between the front face of said optical fibers and the image projected by said optical means.

2. In a device of the character described comprising in combination, an endoscope including, an elongated coherent bundle of optical fibers for transmitting a light image from the front to the rear of said endoscope, an optical objective means mounted in front of said bundle for projecting an image on the front face of said bundle, focusing means moving the front fact of said bundle of fibers selectively to and from said objective means for focusing said image formed by said objective means in the same plane as the front face of said bundle of fibers including, a pair of opposed tension members secured to said bundle at the forward end thereof and extending rearwardly through said endoscope, adjusting means connected to the rear end of said tension members to provide means for adjusting said focusing means from the rearward end of the said endoscope.

3. In a device of the character described comprising in combination, an endoscope including an elongated coherent bundle of optical fibers transmitting a light image from the front to the rear of said endoscope, an optical objective means mounted in the front of said endoscope projecting an image on the front face of said bundle of optical fibers, focusing means controllably moving the front face of said bundle of fibers selectively to and from said objective means to focus the image received from said objective means on th front face of said bundle of fibers including, a windlass means mounted in the rear end of said endoscope, tension members connected to said windlass means and extending forwardly in said endoscope, means connecting the forward end of said tension members to the forward end of said bundle of optical fibers, means in said endoscope reversing the direction of one of said tension members to selectively provide a forward tension and a rearward tension on the forward end of said bundle of fibers responsive to the direction of rotation of said windlass means and provide a coincidental relationship between the front face of said bundle of fibers and the image projected from said optical means when said focusing means is operated.

References Cited in the file of this patent

UNITED STATES PATENTS

| | | |
|---|---|---|
| 1,950,166 | Durholz | Mar. 6, 1934 |
| 2,479,792 | Tackaberry | Aug. 23, 1949 |
| 2,732,763 | Black et al. | Jan. 31, 1956 |
| 2,877,368 | Sheldon | Mar. 10, 1959 |
| 2,932,294 | Fourestier et al. | Apr. 12, 1960 |
| 2,937,570 | Hillman | May 24, 1960 |
| 3,010,357 | Hirschowitz | Nov. 28, 1961 |